UNITED STATES PATENT OFFICE.

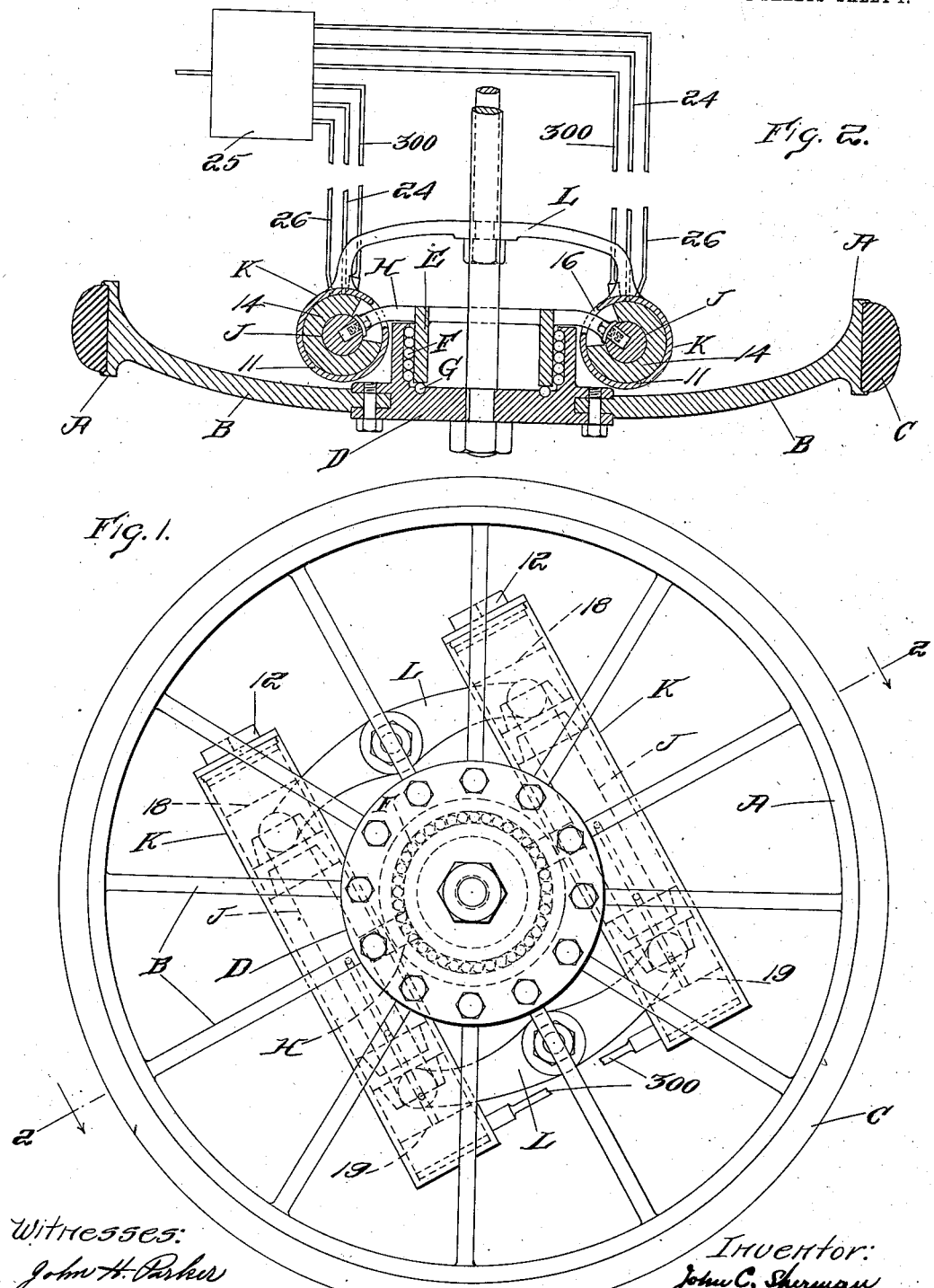

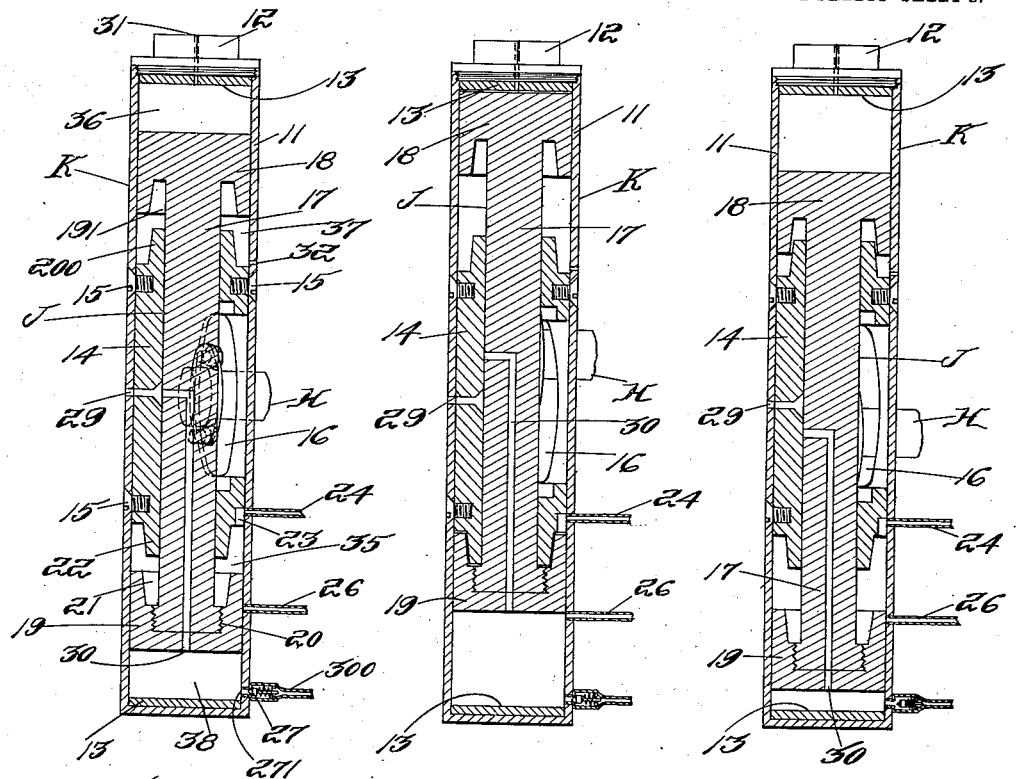

JOHN C. SHERMAN, OF BROOKLINE, MASSACHUSETTS.

CUSHIONING DEVICE FOR VEHICLES.

1,027,288.  Specification of Letters Patent.  Patented May 21, 1912.

Application filed June 23, 1910. Serial No. 568,447.

*To all whom it may concern:*

Be it known that I, JOHN C. SHERMAN, a citizen of the United States, residing at Brookline, in the county of Norfolk and State of Massachusetts, have invented a certain new and useful Improvement in Cushioning Devices for Vehicles, of which the following is a specification, reference being had therein to the accompanying drawings.

My invention has for its object a new and improved cushioning device to prevent the transmission of jars or shocks. While intended particularly to take the place of pneumatic tires on motor propelled vehicles, it is applicable to other and a great variety of uses. It may, for instance, be used on railroad cars and horse drawn vehicles as well as upon motor propelled vehicles. I also believe it to be useful as a cushioning device for elevators, and between railroad cars and in many other places where cushioning devices are required.

In the following specification and in the accompanying drawings my invention is shown as applied to the wheels of a motor vehicle, but I do not limit myself to this application of my invention, and it is to be understood that the devices which embody my invention are to be used in other places as desired. Such modifications as may be required to adapt it to use in other places may be readily made by those persons skilled in the art to which my invention pertains.

The device embodying my invention is dependent for its operation on the action of compressed air or some other elastic fluid confined between a piston and a casing, provision being made for controlling any unusual shock and the subsequent recoils therefrom by introducing into the appropriate part of the casing at the proper moment a suitable quantity of the liquid under a pressure which has been independently given to it, and at a proper moment venting the space to the atmosphere before a recoil of substantial magnitude can occur. A peculiar arrangement of the piston and ports, which will be later described, vents the compressed air to the atmosphere at the proper moment and reduces the vibratory movements of the piston so rapidly that they are nearly imperceptible, the effect of the device being to restore the parts immediately to normal position after any shock, and to dampen quickly the vibratory motion.

The invention will be fully understood from the following description taken in connection with the accompanying drawings, and the novel features are pointed out and clearly defined in the claims at the close of the specification.

In the drawings,—Figure 1 is a side elevation of a wheel and axle to which is applied a cushioning device embodying my present invention. Fig. 2 is a section on line 2—2, Fig. 1, looking in the direction of the arrows. In this figure the main reservoir and connections thereto are indicated diagrammatically. Figs. 3, 4 and 5 are longitudinal sections of the piston and cylinder comprising one of the cushioning devices, the figures showing three characteristic positions of the parts.

Referring now to the drawings and more particularly to Figs. 1 and 2,—at A is indicated the rim and at B the spokes of the wheel. The said wheel may, if desired, be fitted with a small solid rubber tire C to quiet the noise and to reduce the vibration which would otherwise be transmitted to the body of the vehicle through the various members which support the body, since all of said members are made of metal and are in actual contact with each other so that some lateral vibration caused by contact of the wheel with hard substances, such as paving stones, is transmitted to the body, although the larger and approximately vertical shocks caused by running over stones or uneven places in the road are largely damped out by my cushioning device and not transmitted to the body. The said spokes B are bolted to a central hub D, which is free to turn on a cone E, ball-bearings F and G being provided to reduce the friction. Cone E has secured thereto a yoke H to the ends of which are attached the pistons J, J, operating in cylinders K, K. The cylinders K, K, are themselves held by a pair of yokes L, L, to which the body (not shown) of the vehicle may be secured in any convenient manner. From the foregoing it will be seen that the load of the vehicle is supported on the cylinders K, K, while the wheel is secured to the pistons J, J, contained within the said cylinders. While I have shown the cushioning devices as located at this point between the ground and the body of the vehicle, it is obvious that they may be otherwise located. I prefer, however, to place these devices, when employed in vehicles, as near the ground as possible so as to reduce as far as is practicable the mass of the substantially uncushioned portion of the vehicle.

The construction of the pistons and cylinders hereinbefore referred to will be plainly seen from Figs. 3 to 5 inclusive which show various positions of the parts. The cylinder consists of a hollow casing 11 closed at the upper end with a screw plug 12 and at the lower end by a wall preferably formed integral with the casing. In both ends of the cylinders, elastic washers 13, 13, of rubber or some other suitable substance, are provided in case at any time the piston comes in contact with the end of the cylinder. The central portion of the casing is closed by a body portion 14 secured by screws 15 to the said casing. The casing 11 is cut away on one side to form a slot 16 through which the end of the yoke H passes in order that it may be secured to the piston J. This piston J is of peculiar shape having a stem 17 which passes through a hole bored in the center of the body portion 14, and having a head 18 formed on one end, and, on the other end, a head 19 secured by means of screw-threads 20. This construction is employed for convenience in assembling. The under face of the piston head 18 has an annular groove 191 formed therein corresponding substantially in size and shape to an annular rib 200 formed on the body 14. A similar groove 21 is formed in the upper side of the head 19 and coöperates with an annular rib 22 on the lower side of the body 14. The formation of the annular grooves in the piston head and the coöperating annular flange on the body increases the amount of bearing surface between the moving parts and reduces the difficulties arising from leakage. The upper piston head 18 and the portion of the cylinder or casing with which it coöperates are believed to be not essential to the theoretical operation of the device, but in practice they make it possible for the piston to have a large bearing surface at each end where it is best situated to withstand any twisting strains which may be put upon the device, thus making the device less likely to wear. The spaces above and below the upper piston head 18 also are employed to contain the cushioning medium which may or may not be at pressure greater than atmospheric. They, therefore, assist in the operation of the device. The space between the lower piston head 19 and the body 14 is connected by a port 23 and pipe 24 to a reservoir 25, see Fig. 2, in which a supply of air or other suitable gas under pressure is provided. Another pipe 26 also leading to the reservoir 25 enters the casing at a point about half way between the port 23 and the bottom of the casing. This pipe 26 is so located that its mouth will be uncovered only when the piston J rises very high in the casing—that is, to an extreme position—as is the case when a severe impact is received by the wheel from some obstacle in the road. The space in the bottom of said casing is also provided with a relief port 271 closed by a spring check-valve 27 and leading through a pipe 300 to the reservoir 25. In the body 14 of the casing is a bell-mouthed port 29 which registers with the end of an exhaust passage 30 leading through the piston stem from the lower end of the piston J when the piston is in mid position. The space in the top of the casing is vented to the atmosphere by a minute relief port 31; and the space between the end of the body and the under side of the piston head 18 is also vented to the atmosphere by means of another minute relief port 32.

The operation of my improved cushioning device will now be described, having particular reference to the effect of the various ports: It will be understood, as previously stated, that the body of the vehicle is secured to the casing 11, while the wheel is secured to the piston. Therefore, any obstruction in the road tends to raise the wheel and the attached piston. With the parts in their normal position, as shown in Fig. 3, air under a suitable pressure, for instance two hundred pounds to the square inch, is introduced through pipe 24 and port 23 from the main reservoir 25 or other suitable source of supply to the space 35 between the body 14 and the upper side of the lower piston head 19. The pressure on the elastic medium employed should be such as to sustain the piston at substantially its mid position when the vehicle is at rest. This pressure will of necessity be varied according to the load so that the pistons will be properly centered. The air in the space 36 above the upper piston head 18 is at atmospheric pressure, being vented to the air. The air in the space 37 between the under side of the piston head 18 and the body 14 is likewise at atmospheric pressure. The same is true of the air in space 38 below the lower piston head, as the passage 30 registers with the port 29 which leads to the atmosphere, when the parts are in the position shown in Fig. 3. If the vehicle goes over a small obstacle in the road, such as a small pebble, the piston J will be raised slightly, the casing being held substantially stationary by the inertia of the body. This movement will tend to compress further the air contained in the space 35 and in the reservoir 25, this air being already under high pressure. It will also tend to compress the air in the space 36 and expel it slowly through the port 31. After the vehicle has gone over the pebble, the compressed air in the main reservoir and space 35 tends to restore the displaced parts to their original position. It will be understood that there is a slight recoil and oscillation on each side of the center or mid position, but under ordinary conditions, this may be left out of consideration. This is what may be termed the ordinary operation of the device. It is obvious, however, that if no further controlling means is provided and if the obstruction is a large one, so that the impact on the wheel is violent, both the original movement of the piston and its subsequent tendency to recoil or rebound will be large, and there will result a series of vibrations of lessening amplitude which are exceedingly undesirable. In fact, as is well known in the operation of motor vehicles, the recoil or rebound is sometimes so great as to be dangerous and to do injury to the running gear of the vehicle. It will be understood, of course, that the large original movement of the piston is desirable in order that the blow may not be transmitted violently but that it is equally desirable that the piston be returned to its original or normal position with the shortest possible series of subsequent oscillations; in other words that the damping effect be the most rapid possible. In my improved cushioning device, I have made provision by means of which the recoil and subsequent vibration is diminished and rapidly damped. If the wheel passes over a large obstruction in the road, or drops into a deep hole, so that the piston J attached to the wheel is thrown violently upward relatively to the body of the vehicle and the cylinder K, the parts then assume the position shown in Fig. 4. It will be seen that the upward movement of the piston J compresses the air in the space 35 and the main reservoir 25 (see Fig. 2) as well as the air at atmospheric pressure above the upper end 18 of the piston but owing to the constriction of the passage leading to the main reservoir, the pressure in the space 35 will during the upward movement of the piston, be somewhat greater than that in the main reservoir. The upward movement of the piston J moves the end of the passage 30 out of registration with the bell-mouthed port 29 and closes the passage so that the space 38 below the piston head 19 is then closed to the atmosphere. At about the extreme upward point in its movement, the lower end 19 of the piston J uncovers the mouth of the pipe 26 which then opens into the space 38. As previously stated, said pipe 26 is also connected with the main reservoir 25 so that as soon as the mouth of the pipe 26 is uncovered by the piston, air from the said main reservoir 25, which is under a high pressure, rushes into the space 38 tending to fill it, but the pressure in the space 38 will be less than the pressure in the main reservoir owing to the fact that the port is open only momentarily and is not large enough to permit an instantaneous adjustment of pressures. The recoil (that is, the tendency of the piston J and attached parts to move downwardly from the position shown in Fig. 4) is, therefore, checked by the air in the space 38, the port leading to the pipe 26 being closed by the piston J by its first downward movement. This recoil is caused by the pressure in the space 36 which is above that of the atmosphere since the vent is minute, and by the difference in pressures in the spaces 35 and 38 which although these spaces are connected with the main reservoir is considerable by reason of the constriction of the passages leading to the main reservoir, as well as by the action of the mechanical springs of the vehicle, if such springs are used, and the natural springiness of the vehicle body itself. As the piston descends owing to the recoil, the air in the space 38 is rapidly further compressed and rises to about twice the original pressure in the said space before the mouth of the passage 30 registers with the bell-mouthed port 29. This sudden increase in pressure in the space 38 underneath the piston tends to check the recoil. When the recoil is wholly absorbed by the compression of the air in space 38, there is a tendency to a counter-recoil. This counter-recoil is, however, prevented by the fact that just at the time when it is about to occur, the exhaust passage 30 comes into registration with the bell-mouthed port 29, and the air under pressure in the space 38 is allowed to escape until the piston resumes its normal position and the air in the space 38 is again at atmospheric pressure. The operation just described is that which occurs when the recoil of the piston is just absorbed by the compression of the air in space 38 at the time when the exhaust port 30 is opened. If the recoil is even greater, the piston will be carried still farther downward and the mouth of the exhaust passage 30 carried by the bell-mouthed port 29, whereupon the space 38 is again closed to the atmosphere and the air therein, which is already at whatever pressure remains after the preceding venting to the atmosphere, is still further compressed until the recoil is entirely absorbed. As soon as the counter-recoil which then occurs brings the mouth of the exhaust passage 30 in registration with the bell-mouthed port 29, the tendency of the counter-recoil is immediately and completely checked by the reduction of the pressure in the space 38.

In order that any shock due to the too sudden checking of the downward movement of the piston may be prevented, I provide a relief port 27 which opens when the pressure in the space 38 rises above a certain predetermined amount. The opening of the relief port allows the escape of sufficient air to keep the pressure in the space momentarily constant at said predetermined amount and thus causes the downward movement of the piston to be checked slowly instead of abruptly. The gradual checking of the piston also correspondingly diminishes the tendency to a counter-recoil. In other words, if the relief valve is set to exhaust at three hundred pounds, the only counter-recoil will be that due to the three hundred pounds instead of that due to some much higher pressure which would be produced if the pressure were not relieved by the relief valve. On the counter-recoil, the pressure in the space is reduced so rapidly when the exhaust passage 30 again opens through the port 29 that the impelling force of the compressed air behind the piston is immediately and almost completely dissipated. It will be seen that all the air in the space 38 which escapes past the relief valve 27 is at a pressure in excess of that at which the relief valve 27 is set to open. This compressed air may be saved by providing a connection 300 from the relief valve 27 to the main reservoir. In this way, the loss of air due to the operation of the device may be materially diminished.

In Fig. 5 are shown the positions of the various parts when the piston is at about lowermost position and at this point the relief valve 27 is shown as having opened.

From the foregoing description it will be seen that under what I have termed the ordinary movements of the cushioning device, there is theoretically no loss of compressed air through the operation of the parts; however, in what I have termed the emergency operation of the device there is a slight loss of compressed air due to the fact that a portion of the air under pressure in the space 38 is vented into the atmosphere through the exhaust port 30 and bell-mouthed port 29. A portion of the air under pressure in the space 38, however, is saved by connecting the relief port 27 with the main reservoir, as previously described. The loss occasioned is, however, comparatively slight and may be made up in any convenient way, either by the use of a pump to maintain the pressure in the reservoir 25 or by the use of an additional supply from another tank.

When applied to the wheels of a vehicle, as is illustrated in Fig. 1 of the drawings herein, I consider it desirable to locate the cushioning devices at a slight angle to the vertical and face them in the direction in which the vehicle ordinarily moves so that they may take up as much as possible the horizontal component of the blow struck by the wheel against any obstacle in the road as well as the vertical component of the blow. It will be understood, however, that if the blow to be cushioned against is wholly vertical or wholly horizontal, as may be the case where the device is put to other uses, the cushioning devices will be correspondingly placed.

What I claim is:—

1. The improved cushioning device comprising a casing, a piston in said casing and dividing the space in said casing into two spaces, one above and one below said piston, said piston having an exhaust passage leading from the space below the piston, said casing having a port opening into the space below the piston and normally covered by the piston but open when the piston is in an extreme position, means to supply air under pressure to the space above the piston and through the said port in the said casing to the space below the piston, said casing also having an exhaust port which is in registration with the said exhaust passage when the piston is in a predetermined position.

2. The improved cushioning device comprising a casing, a piston in said casing and dividing the space in said casing into two spaces, one above and one below said piston, said piston having an exhaust passage leading through the stem of the piston from the space below the piston, said casing having a port opening into the space below the piston and normally covered by the piston but open when the piston is in an extreme position, means to supply air under pressure to the space above the piston and through the said port in the said casing to the space below the piston, said casing also having an exhaust port in the portion thereof which is adjacent the stem of the piston, said exhaust port being in registration with the said exhaust passage when the piston is in a predetermined position.

3. The improved cushioning device comprising a casing having chambers in each end, a double headed piston, the heads of which operate in the said chambers, one of said heads dividing one of said chambers into two spaces, one above and one below the said piston head, said piston having an exhaust passage leading from the space below the said piston, said casing having a port opening into the space below the piston and normally covered by the piston and open when the piston is in an extreme position, means to supply air under pressure to the space above the piston and through the said port in the said casing to the space below the piston, said casing also having an exhaust port which is in registration with the said exhaust passage when the piston is in a predetermined position.

4. The improved cushioning device comprising a casing having a chamber in each end, a double headed piston, the heads of which operate in the said chambers, the said heads dividing each of said chambers into two spaces, one above and one below each of the said piston heads, one of the said piston heads having an exhaust passage leading from the space below it, said casing having a port opening into the space below the lower piston head and normally covered by the said piston head but open when the piston is in an extreme position, means to supply air under pressure to the space above the said piston head and through said port in the said casing to the space below it, said casing also having an exhaust port which is in registration with the said exhaust passage when the piston head is in a predetermined position.

5. The improved cushioning device comprising a casing having a chamber in each end, a double headed piston, the heads of which operate in the said chambers, the said heads dividing each of said chambers into two spaces, one above and one below each of the said piston heads, one of the said piston heads having an exhaust passage leading from the space below it, said casing having a port opening into the space below the lower piston head and normally covered by the said piston head but open when the piston is in an extreme position, means to supply air under pressure to the space above the said piston head and through said port in the said casing to the space below it, said casing also having an exhaust port which is in registration with the said exhaust passage when the piston head is in a predetermined position, and leakage ports from the said upper chamber to maintain the pressure on both sides of the piston therein at atmospheric pressure when the piston is at rest.

6. The improved cushioning device comprising a casing having chambers in each end, a double headed piston in two parts, the heads of which operate in the said chambers, one of said heads dividing one of said chambers into two spaces, one above and one below the said piston head, said piston having an exhaust passage leading from the space below the piston, said casing having a port opening into the space below the piston and normally covered by the piston and open when the piston is in an extreme position, means to supply air under pressure to the space above the piston and through the said port in the said casing to the space below the piston, said casing also having an exhaust port which is in registration with the said exhaust passage when the piston is in a predetermined position.

7. The improved cushioning device comprising a casing, the piston in said casing dividing the space in said casing into two spaces, one above and one below the said piston, said piston having an exhaust passage leading through the stem of the piston from the space below the piston, said casing having a port opening into the space below the piston and normally covered by the piston but open when the piston is in an extreme position, a port to supply air under pressure to the space above the piston, said port being located beyond the extreme travel of the piston, means to supply air under pressure through the said port in the casing to the space below the piston, said last mentioned port being uncovered when the piston is in extreme position, said piston also having an exhaust port which is in registration with the said exhaust passage when the piston is in a predetermined position.

8. The improved cushioning device comprising a casing, a piston in said casing and dividing the space in said casing into two spaces, one above and one below said piston, said piston having an exhaust passage leading through the stem of the piston from the space below the piston, said casing having a port opening into the space below the piston and normally covered by the piston but open when the piston is in an extreme position, a source of supply of compressed air supplying air through the ports in said casing to the space above the piston and when the second of said ports is uncovered to the space below the piston, a relief valve operating at a predetermined pressure to vent to the atmosphere the space below the piston, said casing also having an exhaust port which is in registration with said exhaust passage when the piston is in a predetermined position.

9. The improved cushioning device comprising a casing, a piston in said casing and dividing the space in said casing into two spaces, one above and one below said piston, said piston having an exhaust passage leading through the stem of the piston from the space below the piston, said casing having a port opening into the space below the piston and normally covered by the piston but open when the piston is in an extreme position, a source of supply of compressed air supplying air through the ports in said casing to the space above the piston and when the second of said ports is uncovered to the space below the piston, a relief valve operating at a predetermined pressure to vent to the atmosphere the space below the piston, said casing also having an exhaust port which is in registration with said exhaust passage when the piston is in a predetermined position, and connections from said relief valve to the said main reservoir whereby the air under pressure escaping through the relief valve is returned to the source of supply.

10. The improved cushioning device comprising a casing, a piston within the said casing dividing the space in the said casing into two spaces, one above and one below the said piston, said casing having a portion thereof cut away on one side to form a slot, a bracket or arm connected with said piston and passing through said slot, said piston having an exhaust passage leading from the space below the said piston, said casing having a port opening into the space below the piston and normally covered by the piston but open when the piston is in an extreme position, means to supply air under pressure to the space above the piston and through said port in the said casing to the space below the piston, said piston also having an exhaust port which is in registration with said exhaust passage when the piston is in a predetermined position.

11. The improved cushioning device comprising a casing having a chamber in each end, a double headed piston, the heads of which operate in the said chambers, the said heads dividing each of said chambers into two spaces, one above and one below the said piston, said piston having an exhaust passage leading from the space below the lower piston head, said casing having a port opening into the space below the lower piston head and normally covered by the said piston head but open when the piston is in an extreme position, means to supply air under pressure to the space above the lower piston head and through said port in the said casing to the space below said lower piston head, said casing also having an exhaust port which is in registration with the said exhaust passage when the piston is in a predetermined position, said piston head having an annular groove adjacent the piston stem and said casing having an annular rib about the said piston stem coöperating with the said annular groove.

12. The improved cushioning device comprising a source of supply of air under pressure, a casing, a piston in said casing, air under pressure in the space on one side of the piston supporting the normal load on the cushioning device, connections from the source of supply to the spaces on both sides of the piston, a valve operated by the piston to admit compressed air from the source of supply to the space on the other side of the piston when the piston is in an extreme position and the recoil begins and a valve operated by the piston and discharging the air under pressure from said space when the recoil is checked.

13. The improved cushioning device comprising a source of supply of air under pressure, a casing, a piston in said casing, air under pressure in the space above the piston supporting the normal load on the cushioning device, connections from the source of supply to the spaces on both sides of the piston, and valves operated by the piston and controlling the supply of compressed air to and the discharge thereof from the space below the piston whereby air under pressure is supplied to the space below the piston at the instant the recoil begins, and is exhausted therefrom when the recoil is checked.

14. The improved cushioning device comprising a source of air under pressure, a casing, a piston in said casing, air under pressure in the space above the piston supporting the normal load on the cushioning device, a connection from the source of supply to the space above the piston, another connection from the source of supply admitting compressed air to the space under the piston only when the piston is in an extreme position, said connection being closed when the piston is in the normal position, and a valve operated by the piston controlling the discharge of the compressed air from the space below the piston when the recoil is checked.

In testimony whereof I affix my signature, in presence of two witnesses.

JOHN C. SHERMAN.

Witnesses:
GEORGE T. DIB,
ALICE H. MORRISON.